Patented Oct. 10, 1944

2,359,878

UNITED STATES PATENT OFFICE 2,359,878

POLYMERIC COMPOSITIONS

Orion E. Schupp, Jr., Wilmington, Del., assignor to E. I. du Pont de Nemours & Company, Wilmington, Del., a corporation of Delaware No Drawing. Application August 9, 1941,
Serial No. 406,174

10 Claims. (Cl. 260—29)

This application is a continuation-in-part of my application Serial No. 362,660, filed October 24, 1940.

This invention relates to new compositions of matter comprising synthetic linear polyamides of the types described in U. S. Patents 2,071,250, 2,071,253, and 2,130,948. For convenience these polyamides will be referred to at times hereinafter simply as polyamides.

The polyamides, generally speaking, comprise the reaction product of a linear polymer-forming composition, for example, one consisting essentially of bifunctional reacting material, which comprises in substantial amount molecules containing two amide-forming groups each of which is complementary to an amide-forming group in other molecules in said composition. These polyamides can be obtained, for example, by self-polymerization of a monoaminomonocarboxylic acid, or by reacting a diamine with a dibasic carboxylic acid in substantially equimolecular amounts, it being understood that reference herein to the amino acids, diamines and dibasic carboxylic acids is intended to include the equivalent amide-forming derivatives of these reactants. In the polyamides obtained from these reactants the average number of carbon atoms separating the amide groups is at least two.

The high molecular weight requisite for imparting the best fiber-forming properties to the polyamides is attained by continuing the polymerization until the intrinsic viscosity, defined in U. S. P. 2,130,948, is at least 0.4. The polyamides then have the capacity for being cold drawn (i. e. drawn under tension in the solid state) with permanent and high linear extension from 200% to 500% or more to yield textile fibers showing by X-ray examination molecular orientation along the fiber axis. Oriented products also may be obtained by other methods of cold working, for instance, in the case of oriented sheet or film material, by cold rolling.

The polyamides as a class characteristically require corrosive media such as strong or concentrated acids, phenols, cresols and the like, as solvents, where solutions having useful degrees of concentration are needed. And even in the case of some of the more soluble types of the polyamides, which have been found to be soluble in higher alcohols at elevated temperatures or in heated mixtures of lower alcohols with other liquids such as chlorinated hydrocarbons or water, instability of solution and gelation on cooling have occasioned considerable difficulty. Furthermore, and particularly when acids are used as solvents, degradation of the polyamide constitutes a serious obstacle, especially at higher temperatures and concentrations, and even when phenolic solvents are employed.

Because of the acute scarcity of solvents which are suitable for the more usual types of polyamides, from the standpoints of non-corrosiveness, low-cost and solvent power, as well as from the standpoint of ease of recovery for reuse, a serious need has existed for the discovery of solvents with which polyamide solutions of suitable concentration and stability can be prepared conveniently, economically, and with maximum safety both to personnel and to equipment, and which can readily and conveniently be recovered for reuse or re-cycling during the employment of the polyamide solutions for transforming the polyamides into other forms, particularly readily dispersible solid particles or dispersions thereof, as well as coatings and the like.

This invention therefore has as objects the preparation of polyamide solutions in relatively non-hazardous, non-corrosive, non-degrading, and non-expensive solvents, the provision of a method for imparting solvent properties to, or increasing the solvent properties of, such solvents for the polyamides, the enhancement of the stability and non-gelation characteristics of polyamide solutions, the efficient and economical transformation of the polyamides into fine solid particles for use in the production of uniform dispersions in non-solvent liquids, the preparation of such dispersions, and the economical application of such dispersions, as well as of such solutions, in the formation of coatings, films and the like. Other objects will appear hereinafter.

The accomplishment of the foregoing objects is made possible by dissolving the polyamides in solutions of metal salts in alcohol, preferably lower aliphatic alcohol, and then effecting precipitation, or precipitation followed by redispersion, of the polyamide, according to the procedure hereinafter described. The practice of the invention is especially useful in the case of polyamides which are not soluble in the particular alcohol per se.

In most cases polymer solutions of high solids content and good stability can be conveniently prepared by agitating the polymer with the solvent mixture at room temperature or at slightly higher temperatures. In some cases, however, it is advantageous to agitate the polymer with the solvent mixture at the boiling point of the latter, under a reflux condenser. A given solvent medium may have only a swelling action on a given polymer at room temperature, forming a rigid or non-fluid gel. A gel of this type can be dispersed to a fluid solution by heating to a minimum temperature which varies with the nature of the composition. Solutions prepared in this manner will solidify again to a gel after cooling to room temperatures or below the minimum temperature required to effect solution originally. The time interval which elapses before a gel is formed varies with the nature of the polymer, the solvent medium and the plasticizers or other materials present in the composition. In some cases such super-cooled solutions can be handled at room temperature for as long as several days before gel formation occurs. In other cases, a gel may be formed within several minutes after cooling to room temperature.

Production of dispersible polyamide particles from the alcohol-salt-polyamide solutions in accordance with the invention is effected by diluting the said solutions with a non-solvent for the polyamide, thus causing precipitation of the latter. A preferred non-solvent for use in the accomplishment of this objective is an excess of the same alcoholic medium as that used in forming the said solution. Ease of recovery of the said medium, without any need for separation of other liquids therefrom, thus is made possible, along with maximum convenience in re-cycling; whereas purification by fractionation or otherwise ordinarily would be necessitated if the precipitation were effected by dilution of the alcohol-salt-polyamide solution with, or introduction of the same into, a different precipitating medium.

The dilution of the alcohol-salt-polyamide solution with the non-solvent medium—preferably in large amount—advantageously is accompanied with vigorous stirring; after which the precipitated polyamide is separated and used as such, e. g., as a substitute for vitreous frits. The precipitated finely divided polyamide can also be re-dispersed by vigorous mechanical dispersing means, e. g. in a colloid mill, in a non-solvent which ordinarily should be neutral or inert with respect to the material to which it may be intended to apply the dispersion, for coating or impregnating purposes. Usually it is desirable to filter and wash the precipitated polyamide, prior to the setting up of the dispersion.

It may be observed that while the mechanical dispersing means operates to break up any agglomerates of the polyamide particles that may exist, there characteristically is no need for it to effect any size reduction in the individual particles per se.

The salts employed in the practice of the invention are metal salts which are alcohol soluble and substantially inert to the polyamide. In general, the best results have been obtained with those salts whose acid radicals or groups are halide, nitrate, or thiocyanate, and whose metal ions are elements under 31 in atomic number and fall within the first or second group of the periodic system. Metal thiocyanates may be considered inorganic salts and are to be understood as included in the term inorganic salt as used herein. The chlorides, bromides, and nitrates of lithium, calcium, and zinc are particularly effective.

The alcohols employed in the practice of the invention may be saturated or unsaturated. The preferred alcohols are aliphatic alcohols having less than 6 carbon atoms, and particularly those having less than 4 carbon atoms. The limited solubility of the above-stated salts in the higher aliphatic alcohols renders the latter unsatisfactory for the purposes of the invention.

In practicing a preferred embodiment of the invention solutions of polyhexamethylene adipamide in essentially saturated solutions of anhydrous calcium chloride in methanol are first prepared. Calcium chloride dissolves in methanol to give an approximately 25% solution at room temperature, i. e., about 25° C. Agitated in such a solution at room temperature, or preferably at elevated temperatures, polyhexamethylene adipamide chips readily dissolve to form viscous, clear, colorless, and stable solutions. With a stable solution defined as one not gelling within 24 hours at 25° C., stable solutions as concentrated as 24% of polyhexamethylene adipamide, 20% of calcium chloride, and 56% of methanol are readily obtained. It should be understood, however, that utility is not limited to solutions that are stable for at least 24 hours at room temperature. Solutions which gel at room temperature can be used at higher temperatures to prevent gelation. It may be noted, too, that solutions kept above the gelation temperature maintain a constant viscosity for months, indicating no polymer degradation.

The following examples, in which parts are by weight, serve to illustrate the invention.

*Example I*

A mixture comprising 10 parts of polyhexamethylene adipamide fiber, 22.5 parts of anhydrous calcium chloride, and 67.5 parts of methanol is placed in a ball mill, warmed to 45° C., and milled for several hours. A very viscous solution results, which is stable at 25° C. This solution is atomized into 450 parts of rapidly agitated methanol. Polyhexamethylene adipamide separates in finely divided form and is removed from the liquid by centrifuging. It then is washed with water until free of calcium chloride. The centrifuged cake, consisting of finely divided polyamide particles, next is dispersed in water, e. g., by milling in a colloid mill. The particles of dispersed polyamide have an average diameter of 4 microns or less but may be somewhat flocculated. They can be deflocculated, if desired, by addition of a small amount of soap, casein, the products known to the trade as "Gardinol" and "Leukanol," or by various other dispersing agents. Deflocculation decreases the viscosity of the dispersion, permitting the solids content to be raised from 10 to 16% with preservation of workable fluidity.

When the dispersion is utilized for the application of a polyamide coating to an object, the dispersion medium conveniently may be removed by evaporation, after the application of the dispersion to the object, and the residual particles of polyamide melted in situ.

*Example II*

A portion of the initial solution described in Example I, i. e. containing 10 parts of polyhexamethylene adipamide, 22.5 parts of calcium chloride, and 67.5 parts of methanol, is evaporated to dryness to 100° C., the last of the methanol being removed under reduced pressure. The resulting friable dry mass, consisting of polyhexamethylene adipamide and calcium chloride, is ground in a ball mill. When the desired particle size is reached, further grinding of the powder in the presence of water serves to remove the calcium chloride. The powdered polyamide then may be filtered off and dried, or redispersed, as described in Example I. Or, the powdery polymer can be used as such, as an ingredient in pigments, cosmetics or frits, e. g., for application to metals, ceramic ware, fabrics or other surfaces by heat fusion.

Example III

A solution containing 20 parts of polyhexamethylene adipamide, 20 parts of calcium chloride and 60 parts of methanol is precipitated by pouring it in a thin stream of water. The polymer precipitates in spongy weak filaments. The precipitated polyamide is washed with water until it is free of calcium chloride, and then is dried. The completely dried polymer is very brittle and can easily be ground to fine powder by ball milling. The finely divided polyamide may then be dispersed in a non-solvent, e. g. methanol, by ball milling, through the use of a Disper-Mill, or by other methods of dispersing finely divided materials.

The foregoing examples have utilized solutions of polyhexamethylene adipamide in salt-alcohol mixtures, this polyamide being insoluble in lower alcohols except under pressure and at high temperatures. As indicated hereinabove, however, certain other polyamides are soluble in alcohols to a limited degree, or in blends of alcohols with other solvents. But such solutions, as a rule, are stable only at elevated temperatures, or are only stable at room temperatures in dilutions too low to be commercially effective. That both stability and increased concentration of polyamide in solution are obtained by the application of the invention to solutions of soluble polyamides is illustrated in the following two examples, in each of which the solution which was formed was particularly useful for the formation of the dispersible particles and the dispersions of the invention.

Example IV

A solution containing 18.2% on nonvolatile material is prepared by dissolving 5.9 parts of interpolyamide derived from hexamethylene diammonium adipate and 12-aminostearic acid in a ratio of 40:60, 1.18 parts of 1,12-diphenylol-octadecane, 0.79 part of propyleneglycol-castor oil reaction product, and 0.87 part of calcium chloride in 39.3 parts of a warmed, mixed solvent comprising 75 parts of 95% ethanol (wt.), 20 parts toluene, and 5 parts of water. The most concentrated solution of suitable stability which could be prepared with the said ingredients, in the absence of the calcium chloride was only 10%.

This solution was especially suitable for yielding dispersible particles on dilution with large quantities of ethanol, e. g. by pouring the polyamide solution in four times its volume of vigorously agitated ethanol.

Example V

A pigment dispersion is prepared by ball milling a mixture of 699.6 parts of bone black, 110.4 parts of ultra-marine pigment, 567 parts of butyl phthalyl butyl glycolate, and 508.6 parts of amylbenzene-sulfonamide. One hundred seventy-four and five-tenths parts of the resulting pigment dispersion then is added to a solution which has been prepared by heating and stirring under a reflux 150 parts of an interpolymer derived from hexamethylene diammonium adipate and 6-aminocaproic acid in a 60:40 ratio, 7.6 parts of butyl phthalyl butyl glycolate, 42.6 parts of amylbenzenesulfonamide, 344 parts of ethyl alcohol, and 115 parts of water. The composition then is homogenized by heating and stirring under reflux. The solution, when allowed to stand at room temperature, sets to a solid gel in less than eight hours. To 100 parts of the solution is added 2 parts of calcium chloride, and the solution is heated and stirred until homogeneous. This solution does not set to a solid gel until it has stood 23 hours and is particularly useful in the preparation of pigmented dispersible particles and dispersions by the practice of this invention.

Example VI

Ten parts of 6-aminocaproic acid polymer is refluxed with 40 parts of lithium bromide and 30 parts of 96% ethyl alcohol. This gives a clear viscous solution which does not gel on cooling. On pouring the solution into a large volume of non-solvent, e. g. ethyl alcohol, with stirring, the polymer separates in finely divided form.

This invention is applicable to synthetic linear polyamides broadly. As additional examples of such polyamides might be mentioned polyhexamethylene sebacamide, polydecamethylene adipamide, poly-meta-phenylene sebacamide, 9-aminononanoic acid polymer, and interpolyamides such as hexamethylene adipamide-decamethylene sebacamide interpolymer, hexamethylene sebacamide-6 aminocaproic acid interpolymer, hexamethylene adipamide-12-amino stearic acid interpolymer, hexamethylene adipamide-caprolactam interpolymer and others.

Although the fiber-forming polyamides are preferred, this invention may also be practiced with the lower molecular weight polyamides obtained from selected reactants or by stopping the polymerization reaction before the fiber-forming stage is reached.

Polymers obtained by admixture with the polyamide-forming reactants of other linear polymerforming reactants, for instance, glycol-dibasic acid mixtures in the case of polyesteramides, are included within the term polyamides. Both the simple and modified linear polyamides contain the recurring amide groups

in which X is oxygen or sulfur and R is hydrogen or a monovalent hydrocarbon radical, as an integral part of the main chain of atoms in the polymer. It should be noted, however, that the ratio of amide linkages to other carbon-noncarbon linkages, as for instance, to the ester groups in the polyester-amides, should be at least 1:20 in order that the polymer shall exhibit the desired polyamide properties. On hydrolysis with hydrochloric acid the amino acid polymers yield the amino acid hydrochloride, and the diamine-dibasic acid polymers yield the diamine hydrochloride and the dibasic carboxylic acid.

It may be mentioned that the amide-forming derivatives which can be used in place of the dibasic carboxylic acid, diamines, and amino acids in the preparation of the polyamides include a number of available compounds. Amide-forming derivatives of the amino acids include the ester, anhydride, amide, lactan, acid halide, N-formyl derivative, carbamate, and, in the presence of water, the nitrile. Amide-forming derivatives of the dibasic carboxylic acids comprise the mono- and di-ester, the anhydride, the mono- and di-amide, the acid halide, and the following compounds in the presence of water: nitrile, cyanocarboxylic acid, cyanoamide, and cyclic imide. Amide-forming derivatives of the diamines include the carbamate, N-formyl derivative and the N,N'-diformyl derivative.

While the usefulness of calcium chloride, particularly in admixture with methanol, has been stressed in the examples, other alcohol-soluble metal salts may be employed, as already stated. Effective types not specified hereinabove, and not necessarily limited to salts of metals of groups 1 and 2 of the periodic system, are exemplified by magnesium chloride, magnesium nitrate, strontium iodide, strontium nitrate, sodium iodide, calcium iodide, cupric bromide, calcium thiocyanate, sodium thiocyanate, potassium thiocyanate, and halides of aluminum, titanium, bismuth, cobalt and iron. In general, salts with good alcohol solubility, i. e., exceeding 5% and preferably over 10%, have marked solvent properties for the synthetic linear polyamides.

Addition of the salts referred to above to solutions of alcohol-water soluble polyamides in alcohol-water mixtures increases the stability of these solutions, i. e. retards gelation. In addition the halides, and particularly the thiocyanates, exert a strong plasticizing effect on the polyamides. For example, at 25° C. and 50% relative humidity, films of the interpolyamide derived from 40 parts hexamethylene diammonium adipate, 30 parts of hexamethylene diammonium sebacate and 30 parts of caprolactam, containing 10% of sodium thiocyanate or magnesium chloride, have pliabilities equal to those of films of the same interpolymer plasticized with 40% of a high boiling phenol. In addition to high pliability, the salt modified films have an unusually high reversible elongation, the undrawn films recovering to an elongation of 75 to 100% on being stretched 500 to 650%. The elongation at break of the sodium thiocyanate and magnesium chloride modified films is from about 550 to 650%. On soaking the films in water the salts are leached out. The magnesium chloride modified film becomes opaque on treatment with water but the sodium thiocyanate modified film remains perfectly clear. If an aqueous alcohol solution of the above interpolymer containing calcium thiocyanate be employed directly for casting films, rather than for the preparation of dispersible particles or dispersions thereof, the films will have a higher clarity than films of unmodified interpolymer cast under the same conditions.

The most effective alcohols ordinarily are methanol, ethanol, n-propanol, and iso-propanol, although n-butanol, iso-butanol, 2-ethyl butanol, methallyl alcohol, ethylene glycol, diethylene glycol, benzyl alcohol, ethylene chlorohydrin, and the like are also effective, particularly with zinc salts, such as zinc bromide. Solubility in the longer chain alcohols frequently is improved by the addition of lower alcohols or lower alcohol-salt complexes. Polyhexamethylene adipamide, for example, is fairly soluble in calcium chloride dissolved in a 3:1 mixture of methyl alcohol and n-butyl alcohol, while calcium chloride-n-butyl alcohol is much less effective as a solvent for this polymer.

Water is tolerated in lesser or greater amounts by polyamide-salt-alcohol solutions. For example, a viscous solution very slowly setting to a gel is obtained by dissolving 25 parts of polyhexamethylene adipamide in 77 parts by weight of 75% methanol-water and enough calcium chloride to saturate. It may be observed, in this connection, that the solubility of the polyamides in dioxane solutions of zinc bromide is actually enhanced by the addition of small amounts of water.

While saturated salt solutions are the more effective solvents, saturation is not essential for the production of solutions. For example, polyhexamethylene adipamide is dissolved both by cold 24% and 20% solutions of calcium chloride in methanol, and even by a hot 16% calcium chloride solution.

Among compounds which can be used as the non-solvent for precipitation of the polymer are included most liquids in which the polymer is only sparingly soluble. Since the solubility behavoir of the linear polymers containing recurring amide groups varies, the liquid used for the precipitation will depend upon the polymer to be precipitated. A liquid which can be used as the solvent for one polymer may be used for the precipitation of another. For example, methanol, which is one of the preferred non-solvents for use in precipitating polyhexamethylene adipamide, is used mixed with formic acid as the solvent for the polymer obtainable from hexamethylenediammonium adipate and epsilon aminocaproic acid. Those compounds which are most generally useful as non-solvents include methanol, ethanol, higher alcohols, higher ketones, ethyl acetate and water.

As media in which to disperse the finely divided polymer may be used any liquid which does not appreciably dissolve or substantially alter the polymer. These include water, methanol, ethanol, higher alcohols, acetone, methyl ethyl ketone, ethyl acetate, ethyl butyrate, amyl acetate, ethyl ether, isopropyl ether, dioxan, benzene, toluene, petroleum hydrocarbons, dichloroethane, chloroform, carbon tetrachloride, dichloroethylene, trichloroethylene, tetrachloroethylene, dichloroethane, trichloroethane, tetrachloroethane, pentachloroethane, mixtures of these liquids and solutions of other materials in these liquids. For most uses it will be desirable to select a volatile dispersing medium.

In view of the different solubility characteristics of different polyamides, the alcoholic salt solutions can be used as media for separating polyamides of different properties by fractional precipitation, the precipitated fraction optionally being utilized independently of the fraction remaining in solution, in the preparation of the dispersions of the invention.

Treatment of a polyamide with alcohol solutions containing insufficient salt to produce solution of the polyamide may greatly embrittle the latter, permitting easy mechanical disintegration without solubility. Normal polymer properties of the disintegrated material are restored by suitable removal of the salt, however, as by draining the excess liquid and then leaching in water, alcohol or other salt solvents.

As indicated in Example II, the finely divided particles of this invention are useful for other purposes than for dispersion in non-solvents. In some instances it is not necessary to isolate the particles for these uses, since the particles can be prepared in situ. Thus, a fabric can be coated and/or impregnated with an alcoholic salt solution of polyamide and then treated, e. g. soaked, in a non-solvent for the polyamide in order to precipitate the latter in finely divided or porous form. This treatment can be used to improve the dyeing characteristics of regenerated cellulose fabrics for acid dyestuffs.

It is within the scope of the invention to modify the polyamide solutions, particles, or dispersions with, or to use them in conjunction with, pigments, dyes, delusterants, resin, waxes, oils, plasticizers, water-repellants, cellulose derivatives, antioxidants, corrosion inhibitors, metal deactivators, and the like. Particularly useful ingredients for the purpose of increasing the stability of the polymer when exposed for long periods to sunlight or elevated temperatures, include such stabilizing agents as phenothiazine, diphenylguanidine, phenyl alpha-naphthylamine, and non-heat-hardening resins of the phenol-formaldehyde type, e. g., fusible, soluble resins prepared from p-tertiary-butylphenol and formaldehyde with the aid of an acid catalyst.

When pigments are dispersed in the solutions, as by grinding or other recognized methods, the solid polyamide particles, on being precipitated, contain or have occluded or dispersed in them or on them, pigment particles in relatively large amounts, an accomplishment otherwise difficult to attain. Dispersions of such precipitates may be used as such, or melt blended with other or additional polyamides to give more dilute pigmented systems.

The polyamide dispersions of the invention are especially useful for the formation of coatings and films. For such use the liquid medium is removed, as by evaporation, and the resulting deposit of polyamide particles is fused by heating. Examples of base materials or supports which are appropriate for receiving coatings thus formed include wood, metal, glass, wire, fabrics, paper, wall paper, regenerated cellulose and the like.

In order to increase the thickness of each layer of coating produced by solvent-evaporation and heat-fusion methods, the expedient may be employed of utilizing as a dispersion medium for dispersion of polyamide particles, an alcohol-salt solution already saturated with polyamide, and then applying the resultant dispersion to the object to be coated. On removal of the alcohol a precipitate of polyamide is formed which, together with the particles of polyamide deposited from the dispersion, may be melted by further heating. Thus, the thicknesses yielded by solution coating and dispersion-fusion coating, respectively, as the result of each pass through a heating zone, may be combined.

The fact that mere dilution of the alcohol-salt-polyamide solutions with quantities of the same alcohol which they already contain yields the finely divided precipitate needed for producing the dispersions of the invention makes possible a unique efficiency in continuous commercial operations. Thus, the relatively dilute metal salt solution in alcohol which remains, after separation of the precipitate, is rendered eligible for reuse as the solvent medium for preparation of fresh supplies of the initial polyamide solutions, by resort merely to the highly simple expedient of adding further quantities of the said salt to it. This unique efficiency comes more particularly into play when the solutions or the dispersions of the invention, or both, are utilized at their source for carrying on continuous coating or impregnation operations. For instance, since application of the solutions to objects to be coated normally must be followed by solvent evaporation procedure involving recovery and re-cycling of the solvent, it becomes possible to return the recovered alcohol to a main supply for re-use in preparing the aforesaid salt-alcohol solvent media, or as the non-solvent for precipitating further polyamide particles therefrom. Further, when such alcohol also is utilized in or as the non-solvent liquid dispersion medium for preparing dispersions of such particles, recovery and returning thereof to the said main supply again is advantageously effected, upon application of the dispersions to the objects to be coated and evaporative removal of the dispersion medium in preparation for or in conjunction with fusion of the deposited polyamide particles on the said objects.

The use of the solutions of the invention for the production of anchor or sub-coats, coupled with the use of the dispersions of the invention for the production of top or upper coats thereover, has special advantages, not only from the standpoint of efficiency in recovery, re-cycling, and re-use of the particular alcohols employed in preparing the said solutions and dispersions, as aforesaid, but also from the standpoint of avoidance of injury to the fabric to be coated. Natural organic textile fibers, whether of cellulose, wool or silk, as well as artificial cellulosic or other textile materials, characteristically undergo serious thermal degradation at temperatures approaching those generally necessary for melting the polyamides, especially those of the fiber-forming varieties, wherefore it usually is impractical to apply polyamide coatings to such materials by ordinary methods, from melt. On the other hand, even though the novel solutions of the invention make it possible to utilize conventional solution coating procedure without resorting to the use of highly toxic, acidic and corrosive solvent media, such solution coating procedure inevitably requires a large number of passes through the solution and then the heating zone, before sufficient coating thickness has been built up. This is because of the thinness of the polyamide deposit produced on the object by each such pass. But if the solutions of the invention be utilized for building up, by conventional low temperature solution coating procedure, a sufficient fraction of the ultimate coating thickness to shield the surface of the object from deleterious thermal injury incident to fusion of thin layers of dispersion particles of polyamide thereafter applied, the remaining fraction can be built up with a much reduced number of passes, by using the dispersion-fusion procedure, since the dispersion, on each pass through the heating zone, ordinarily will yield a considerably thicker deposit than will the solution. It may also be observed, in connection with both the economy in number of passes and the decrease of danger from thermal injury to the base, provided by this procedure, that the use of the solutions for producing the anchor coats results in increased penetration, as compared with the penetration obtained with the dispersions, thus giving rise to superior anchorage between anchor coating and fabric. When this method of coating is applied, it is desirable to wash the salt out of the anchor coat before applying the dispersion.

It is to be noted that by dispersing pigments in the solutions, as by grinding or other recognized methods, products are obtained which not only are useful as printing pastes for fabrics or the like, but also, on precipitation, yield solid polyamide particles containing, or having occluded in them or on them, pigment particles in relatively large amounts. This accomplishment is very difficult to attain in any other manner. Dispersions of such precipitates may be used as such, or melt blended with other or additional polyamides to give more dilute pigmented systems. It may be mentioned, in this connection, that solutions of different polyamides, or of polyamides with other polymers or solutes, can be solution blended and precipitated for the purpose of obtaining homogeneous blends, where melt blending is undesirable or impractical. Blends with silk fibroin e. g. may thus be obtained, since this material has been found to be soluble in alcohol-salt solutions such as zinc chloride-methanol.

One of the advantages of the dispersions of the invention not yet mentioned is their freedom from the tendency to gel which characterizes a number of the conventional polyamide solutions, and the consequently increased ease in handling them. Further, the viscosity of the dispersions does not vary to a troublesome degree, with changes in temperature or on aging, as frequently happens in the case of the solutions. Nor is the tendency of coatings formed from solution to remain tacky after baking generally present in the case of coatings produced from the dispersions.

Whether the dispersions of the invention be employed alone, in the production of the polyamide coatings, or be utilized in conjunction with the solutions of the invention as well, it is significant that the availability of the multiple usefulness and unified recovery and return of the alcohol, described hereinabove, together with the unique economies and advantages incident thereto, would not be possible except for the discovery of the marked increase of solubility of the polyamides which results from addition of the metal salts to the alcohol, and the marked decrease of such solubility which results from the addition of further quantities of the alcohol to the resulting salt-alcohol solutions.

As many apparently widely different embodiments of this invention may be made without departing from the spirit and scope thereof, it is to be understood that I do not limit myself to the specific embodiments thereof except as defined in the appended claims.

I claim:

1. The process of manufacturing dispersible particles of synthetic linear polyamide which comprises dissolving the said polyamide in a solution of an inorganic salt of a metal of groups I and II of the periodic system having an atomic number less than 31 in an alcohol containing less than six carbon atoms, said salt being soluble in said alcohol to an extent exceeding 5% and having its acid radical selected from the class consisting of halide, nitrate, and thiocyanate, and diluting the resulting polyamide-salt-alcohol solution with a non-solvent for the polyamide at least until precipitation of polyamide occurs, said polyamide being one which, on hydrolysis with hydrochloric acid, yields material selected from the group consisting of (a) the hydrochlorides of monoaminomonocarboxylic acids, and (b) mixtures of dibasic carboxylic acid with diamine hydrochloride.

2. The process of precipitating in situ on fibers of a textile fabric a synthetic linear polyamide in porous form which comprises applying to the said fibers a solution of the said polyamide in a solution of an inorganic salt of a metal of groups I and II of the periodic system having an atomic number less than 31 in alcohol containing less than six carbon atoms, said salt being soluble in said alcohol to an extent exceeding 5% and having its acid radical selected from the class consisting of halide, nitrate, and thiocyanate, and diluting the said first mentioned solution with a non-solvent for the said polyamide at least until precipitation of polyamide occurs, said polyamide being one which, on hydrolysis with hydrochloric acid, yields material selected from the group consisting of (a) the hydrochlorides of monoaminomonocarboxylic acids, and (b) mixtures of dibasic carboxylic acid with diamine hydrochloride.

3. The process set forth in claim 2 wherein the said textile fibers comprise regenerated cellulose.

4. The process of manufacturing a dispersion of particles of synthetic linear polyamide which comprises dissolving the said polyamide in a solution of an inorganic salt of a metal of groups I and II of the periodic system having an atomic number less than 31 in an aliphatic alcohol which contains less than six carbon atoms, said salt being soluble in said alcohol to an extent exceeding 5% and having its radical selected from the class consisting of halide, nitrate, and thiocyanate, diluting the resulting alcohol-salt-polyamide solution with a non-solvent for the polyamide at least until precipitation of polyamide occurs, separating the resulting precipitate of finely divided polyamide, and dispersing the same in a non-solvent liquid dispersion medium, said polyamide being one which, on hydrolysis with hydrochloric acid, yields material selected from the group consisting of (a) the hydrochlorides of monoaminomonocarboxylic acids, and (b) mixtures of dibasic carboxylic acid with diamine hydrochloride.

5. The process set forth in claim 4 wherein the said non-solvent liquid dispersion medium is water.

6. The process set forth in claim 4 wherein the said salt is calcium chloride.

7. In the process set forth in claim 1, the steps which consist in utilizing as the said non-solvent for the said polyamide the same alcoholic medium as that present in the said solution.

8. In the process set forth in claim 4, the steps which consist in utilizing, both as the said non-solvent for the said polyamide and as the said non-solvent liquid dispersion medium, the same alcohol as that present in the said solution.

9. The process of manufacturing a dispersion of particles of synthetic linear polyamide which comprises dissolving the said polyamide in a solution of a thiocyanate salt of a metal of groups I and II of the periodic system having an atomic number less than 31 in an aliphatic alcohol which contains less than six carbon atoms, said salt being soluble in said alcohol to an extent exceeding 5%, diluting the resulting alcohol-salt-polyamide solution with a non-solvent for the polyamide at least until precipitation of polyamide occurs, separating the resulting precipitate of finely divided polyamide, and dispersing the same in a non-solvent liquid dispersion medium, said polyamide being one which, on hydrolysis with hydrochloric acid, yields material selected from the group consisting of (a) the hydrochlorides of monoaminomonocarboxylic acids, and (b) mixtures of dibasic carboxylic acid with diamine hydrochloride.

10. The process of manufacturing dispersible particles of synthetic linear polyamide which comprises dissolving the said polyamide in a solution of an inorganic salt of a metal of groups I and II of the periodic system having an atomic number less than 31 in an alcohol containing less than six carbon atoms, said salt being soluble in said alcohol to an extent exceeding 5% and having its acid radical selected from the class consisting of halide, nitrate, and thiocyanate, diluting the resulting polyamide-salt-alcohol solution with a non-solvent for the polyamide at least until precipitation of polyamide occurs, and separating the resulting polyamide precipitate, said polyamide being one which, on hydrolysis with hydrochloric acid, yields material selected from the group consisting of (a) the hydrochlorides of monoaminomonocarboxylic acids, and (b) mixtures of dibasic carboxylic acid with diamine hydrochloride.

ORION E. SCHUPP, JR.